(12) United States Patent
Smith

(10) Patent No.: US 12,189,705 B1
(45) Date of Patent: Jan. 7, 2025

(54) THREE-DIMENSIONAL PUBLICATIONS WITH QUICK RESPONSE (QR) CODE LINKED VIRTUAL CONTENT

(71) Applicant: Talia Tabatha Smith, New York, NY (US)

(72) Inventor: Talia Tabatha Smith, New York, NY (US)

( * ) Notice: Subject to any disclaimer, the term of this patent is extended or adjusted under 35 U.S.C. 154(b) by 0 days.

(21) Appl. No.: 18/413,577

(22) Filed: Jan. 16, 2024

(51) Int. Cl.
*G06F 16/955* (2019.01)
*G06K 7/14* (2006.01)

(52) U.S. Cl.
CPC ....... *G06F 16/9554* (2019.01); *G06K 7/1417* (2013.01)

(58) Field of Classification Search
CPC ............................ G06F 16/9554; G06K 7/1417
See application file for complete search history.

(56) References Cited

U.S. PATENT DOCUMENTS

2019/0001732 A1 * 1/2019 Ongsitco .............. B42D 15/022

OTHER PUBLICATIONS

[Author Unknown] "Incendiary Balloons", [online]. (Publication date unknown) [retrieved on Oct. 7, 2023], Retrieved from the internet https://incendiaryballoons.netlify.app/gallery. 2 pages.
GAGE6917, "QRigami! QR code Origami Flyers", [online]. Instructables; Oct. 27, 2015, [retrieved on Nov. 10, 2015, Retrieved from: https://www.instructables.com/QRigami-QR-code-Origami-Flyers, 10 pages.

* cited by examiner

*Primary Examiner* — Matthew Mikels
(74) *Attorney, Agent, or Firm* — COOLEY LLP

(57) ABSTRACT

A method includes locating a first quick-response (QR) code disposed on a three-dimensional (3D) periodical publication having a 3D shape, the first QR code configured to be located before a second QR code disposed on the 3D periodical publication. Using a mobile compute device, the first QR code is scanned. Via a browser executed at a processor of the mobile compute device, first online content is navigated to based on a first uniform resource locator (URL) encoded by the first QR code. A second QR code is located and scanned, and second online content is navigated to, via the browser executed at the processor of the mobile compute device and based on a second URL encoded by the second QR code.

24 Claims, 9 Drawing Sheets

900

```
┌─────────────────────────────────────────────────────┐
│ Locate a first quick-response (QR) code disposed on a three-
│ dimensional (3D) periodical publication having a 3D shape, the first
│ QR code configured to be located before a second QR code disposed
│           on the 3D periodical publication
│                         902
└─────────────────────────────────────────────────────┘
                              │
                              ▼
┌─────────────────────────────────────────────────────┐
│              Scan the first QR code
│                         904
└─────────────────────────────────────────────────────┘
                              │
                              ▼
┌─────────────────────────────────────────────────────┐
│             Navigate to first online content
│                         906
└─────────────────────────────────────────────────────┘
                              │
                              ▼
┌─────────────────────────────────────────────────────┐
│              Locate the second QR code
│                         908
└─────────────────────────────────────────────────────┘
                              │
                              ▼
┌─────────────────────────────────────────────────────┐
│              Scan the second QR code
│                         910
└─────────────────────────────────────────────────────┘
                              │
                              ▼
┌─────────────────────────────────────────────────────┐
│            Navigate to second online content
│                         912
└─────────────────────────────────────────────────────┘
```

FIG. 9

THREE-DIMENSIONAL PUBLICATIONS WITH QUICK RESPONSE (QR) CODE LINKED VIRTUAL CONTENT

FIELD

At least one embodiment relates to articles for accessing virtual content, and more specifically, three-dimensional articles configured to facilitate access to web-hosted/online content of periodical publications.

BACKGROUND

Known periodical publications can fail to maintain audience engagement. Thus, a need exists for interactive periodical publications that promote, for example, tactile interactions.

SUMMARY

According to an embodiment, an article includes a paper having a first configuration and including a plurality of folds and a plurality of faces. The plurality of faces includes a first face that defines a first plane and a second face that defines a second plane different from the first plane. The first configuration defines an at least partially enclosed volume. The article also includes a plurality of markings. Each marking from the plurality of markings encodes a uniform resource locator (URL) from a plurality of URLs and is configured to be decoded using a mobile compute device. The URL is associated with one of a digital magazine or a virtual museum, and the plurality of markings includes a first marking that encodes a first URL and that is disposed on a first face that is from the plurality of faces. The first face is at least partially obfuscated when the paper is in the first configuration. The plurality of markings also includes a second marking that encodes a second URL to be visited after the first URL and that is disposed on a second face that is from the plurality of faces. The second face is at least partially obfuscated when the paper is in the first configuration. The article also includes at least one instruction for unfolding the paper from the first configuration to a second configuration in which the first marking is fully visible and the second marking is at least partially obfuscated. Additionally, the article includes at least one instruction for unfolding the paper from the second configuration to a third configuration in which the second marking is fully visible.

According to an embodiment, an article includes a three-dimensional (3D) periodical publication including a paper having a plurality of folds defined therein and configured such that the paper, when folded along the plurality of folds, has a 3D shape. A first quick-response (QR) code is disposed on a first portion of the paper that is not outwardly visible by an observer a non-zero distance from the paper when the paper has the 3D shape, and the first QR code is configured to cause a compute device to access first online content. A second QR code is disposed on a second portion of the paper that is not outwardly visible by the observer when the paper has the 3D shape, and the second QR code is configured to cause the compute device to access second online content to be viewed after the first online content. The 3D periodical publication is configured such that the first portion of the paper is revealed to the observer before the second portion of the paper while the 3D periodical publication is being unfolded.

According to an embodiment, a method includes locating (e.g., during an unfolding process) a first quick-response (QR) code disposed on a three-dimensional (3D) periodical publication having a 3D shape, the first QR code configured to be located before a second QR code disposed on the 3D periodical publication is located. Using a mobile compute device, the first QR code is scanned. Via a browser executed at a processor of the mobile compute device, first online content is navigated to based on a first uniform resource locator (URL) encoded by the first QR code. A second QR code is located and scanned, and second online content is navigated to, via the browser executed at the processor of the mobile compute device and based on a second URL encoded by the second QR code.

BRIEF DESCRIPTION OF THE DRAWINGS

FIG. 9 shows a flowchart illustrating a method of scanning QR codes disposed on an article to navigate to online content, according to an embodiment.

DETAILED DESCRIPTION

Some known, flat media publications (e.g., magazine, newspapers, newsletters, and/or other periodical publications) can fail to maintain the engagement of readers due to, for example, the static nature of these media publications. Additionally, some online content (e.g., online and/or virtual magazines) can fail to distinguish itself from the abundance of available online content without, for example, significant advertising campaigns, search engine optimization, and/or the like. Thus, a need exists for media formats that offer audiences with a more immersive experience that includes, for example, tactile interactions and/or feedback. The immersive experience facilitated by these media formats can enhance reader engagement, facilitate better content comprehension, and promote a more profound connection to the material. Moreover, these media formats can include advantages of both print and digital media by, for example, adapting to changing preferences of modern readers while keeping the tactile and/or immersive qualities of print (e.g., physical) magazines.

At least one embodiment described herein relates to a media format implemented in part by a three-dimensional (3D) article. An article can include, for example, one or more of: an origami object (e.g., as described in relation to FIGS. 2 and 3), an articulable door (e.g., a mouse door and/or fairy door, an example of which is described below in relation to FIG. 4), a pottery and/or ceramic object (e.g., as described in relation to FIG. 5), a 3D paper object (e.g., as described in relation to FIG. 6), a diorama (e.g., as described in relation to FIG. 7), and/or any other 3D object, such as 3D printed figurines and/or the like. In some such implementations, such as the articulable door, the pottery and/or ceramic object, and/or the diorama, the associated "article" can alternatively or additionally refer to an interior volume associated therewith. As described herein, the article can include one or more markings (e.g., one or more quick-response (QR) codes) that can encode a uniform resource locator (URL). A mobile compute device (e.g., as described in relation to FIG. 1) can decode (e.g., via a camera and a processor, each included in the mobile compute device) a marking disposed on the article to determine the URL. The mobile compute device can further cause a browser executed at the mobile compute device (e.g., via the processor included in the mobile compute device) to navigate to online content addressed by the URL. The online content can be associated with, for example, a digital magazine and/or a virtual magazine (e.g., as described in relation to FIGS. 8A-8C).

Figure 1:
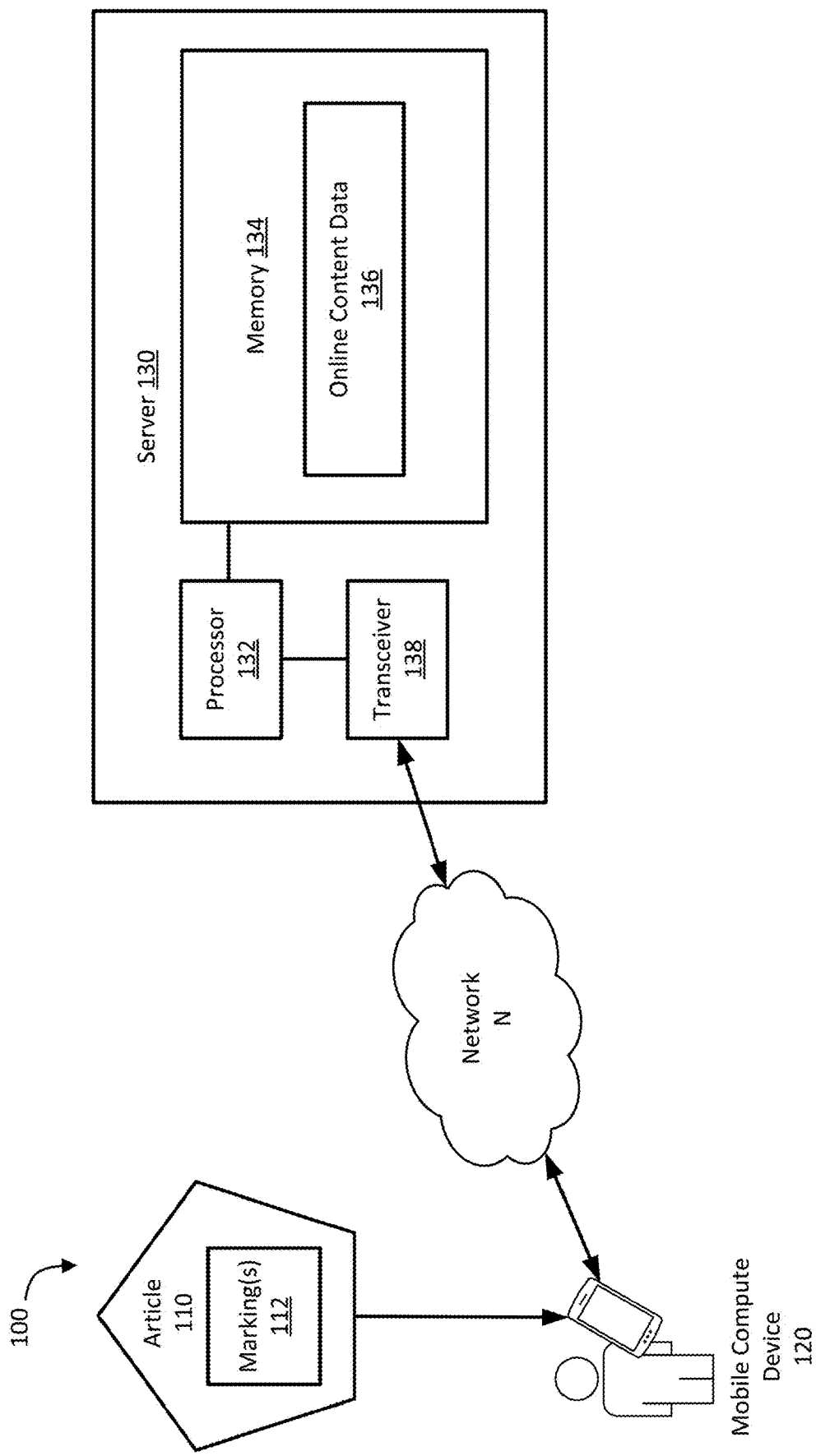
FIG. 1 is a system diagram showing an example implementation of a media system that includes an article and that facilitates access to virtual/web-hosted content, according to some embodiments.

FIG. 1 is a system diagram showing an example implementation of a media system 100 that includes an article 110 and that facilitates access to virtual content, according to some embodiments. As shown in FIG. 1, the media system 100 further includes a mobile compute device 120, a server 130, and a network N.

The article 110 can include, for example, an origami object, an articulable door (e.g., a mouse door and/or a fairy door), a pottery object, a ceramic object, a 3D paper object, a diorama, and/or any other 3D object, as described in relation to, for example, FIGS. 2-7. The article 110 can include one or more markings 112 (e.g., QR code(s), the marking(s) 240 of FIG. 2, the marking(s) 340 of FIG. 3, and/or the like) disposed on the surface of the article 110. The mobile compute device 120 can include, for example, a cell phone, smartphone, laptop computer, tablet, wearable compute device, and/or the like, associated with a user (e.g., an audience member, reader, and/or media consumer). The mobile compute device 120 can include a processor, memory, transceiver, and camera. The user can orient the mobile compute device 120 such that a marking is in a field of view of the camera. Based on an image of the marking generated at the mobile compute device 120 using the camera, the mobile compute device 120 can perform image processing to decode the marking and determine a URL encoded by the marking.

The mobile compute device 120 can use the URL to cause display (at the mobile compute device 120) of online content data 136 stored at a memory 136 included in the server 130. Specifically, the mobile compute device 120 can be communicatively coupled to the server 130 via wired and/or wireless communications network N and via a transceiver 138 included in the server 130. The mobile compute device 120 can send a request to the server 130 to access the online content data 136 using the URL and an internet browser executed at the mobile compute device 120. The server 130 can receive the request via the network N and at a processor 132 included in the server 130. In response to the request, the server 130 can send the online content 136 to the mobile compute device 120 via the network N, and the mobile compute device 120 can display the online content 136 via the internet browser and a display included in the mobile compute device 120.

The online content data 136 can include, for example, text data, image data, video data, animation data, graphics data, and/or the like, associated with a digital magazine, a virtual environment (e.g., a virtual museum), and/or the like. In some implementations, the URL can be a first URL that can link to, for example, a virtual environment (e.g., a virtual museum, such as the virtual museum 810 of FIG. 8) and/or a first virtual location within the virtual environment, such as a first virtual exhibit (e.g., the first virtual exhibit 811 of FIG. 8). The article 110 can include a second marking in addition to the marking (e.g., a first marking) described above, and the second marking can encode a second URL that links to, for example, a second virtual location (e.g., a second virtual exhibit, such as the second virtual exhibit 812 of FIG. 8) included in the virtual environment. A user can navigate between the first virtual location and the second virtual location using the respective markings associated with each virtual location. Additionally, a user can navigate between each virtual location within the virtual environment using the web browser executed at the mobile compute device 120 of the user and without using the respective markings. For example, the online content data 136 can include code defining a graphical user interface (e.g., a GUI, such as the GUI 810 shown in FIG. 8), which can be displayed via the web browser. The user can use the GUI to traverse the virtual environment. The GUI can include arrows that a user can tap (e.g., using a touch screen interface or a cursor and mouse) to traverse the virtual environment. Alternatively, in some implementations, the user can traverse the virtual environment using touch screen gestures (e.g., swipes) and/or tilt gestures, which the mobile compute device 120 can interpret using tilt sensors included in the mobile compute device 120. Alternatively, in some implementations, the virtual environment can be implemented through virtual reality (VR) and/or augmented reality (AR), and a user can view and traverse the virtual environment using a virtual reality and/or augmented reality headset, controllers, and/or the like.

In some implementations, the first URL and the second URL can link to, respectively, first online content and second online content, where each of the first and second online content is associated with, for example, a digital magazine. For example, the first and second online content can each include an exposition, interview, documentary, and/or the like. The user can navigate between the first online content and the second online content using the respective markings that encode the first URL and the second URL. The user can further navigate between the first online content and the second online via the web browser. For example, the first online content can include a link to the second online content, and the second online content can include a link to the first online content. Alternatively or in addition, the first online content and the second online content can each include a link to, for example, a homepage that includes links to both the first online content and the second online content.

As used herein, "publication" can refer to one or more of: (1) content that is published online (i.e., web-hosted content), (2) a 3D article, or (3) a QR code for accessing the content. In some implementations, the article 110 can be associated with a periodical, which can include, for example, a magazine, newspaper, journal, and/or the like. In some embodiments, the article 110 can be inserted into periodical while the article 110 is in an unfolded form (e.g., a second configuration 204, as described in relation to, for example, FIG. 2). For example, the article 110 can be a paper having a plurality of folds defined therein (e.g., printed lines on the paper and/or perforations in the paper, indicating to a user where to fold), such that a user can fold the paper to cause the paper to have an intended 3D shape. Alternatively, in some embodiments, the article 110 itself can be a periodical. For example, the article 110 can be an instance of the periodical (e.g., a periodical publication) that can be published/issued at a regular interval (e.g., weekly, monthly, quarterly, yearly, etc.) and/or can be issued pre-folded (e.g., in a first configuration 202, as described in relation to, for example, FIG. 2). Each periodical publication can be associated with a different topic(s) that is discussed and/or reflected in the online content encoded by the marking(s) 112 included in that periodical publication.

Additionally, each periodical publication can have a three-dimensional shape that is associated with (e.g., that indicates) a topic of that periodical publication and/or the online content encoded by the marking(s) 112. For example, for a monthly periodical, the article 110 can be a first periodical publication issued for a first month. The first periodical publication can have an overall 3D shape of, for example, a house. The first periodical publication can include one or more markings that encode URL(s) that link to online content having a topic associated with (e.g., indicated by, connected with, related to, and/or the like) the 3D house shape. For example, the online content can include commentary on real estate, housing security, and/or any other topic indicated by a 3D house shape. Subsequently, the article 110 can be a second periodical publication issued for a second month and having an overall 3D shape of a flower.

The second periodical publication can include one or more markings that encode URL(s) that link to online content having a topic associated with (e.g., indicated by) the 3D flower shape. For example, the online content can include commentary on horticulture, biodiversity, and/or other topics that a 3D flower shape would indicate. In some implementations, the online content can include an image associated with the 3D shape. For example, the online content linked to by the marking(s) 112 can include a picture, illustration, etc., of an object represented by the 3D shape (e.g., for an article 110 having a house shape, an image of a house). In some instances, at least one marking from the marking(s) 112 can link to content having a topic indicated by the 3D shape. For example, in some instances, all of the at least one markings 112 disposed on the article 110 cannot link to online content having the topic of outer space if the article 110 has a 3D shape of a flower. The association/connection can be direct, such as the 3D shape exactly shown in the online content. Alternatively, the association/connection can be indirect (e.g., by one degree of separation) but of the similar "form". For example, a 3D house could be a federal-style home (e.g., like the White House) and the online content can show a contemporary-style home (e.g., like Falling Water). Alternatively, the association/connection can be even more indirect (e.g., by two degrees of separation). For example, a 3D house could be a federal-style home and the online content can show a contemporary-style non-house building (e.g., the Guggenheim Museum).

Figure 2:
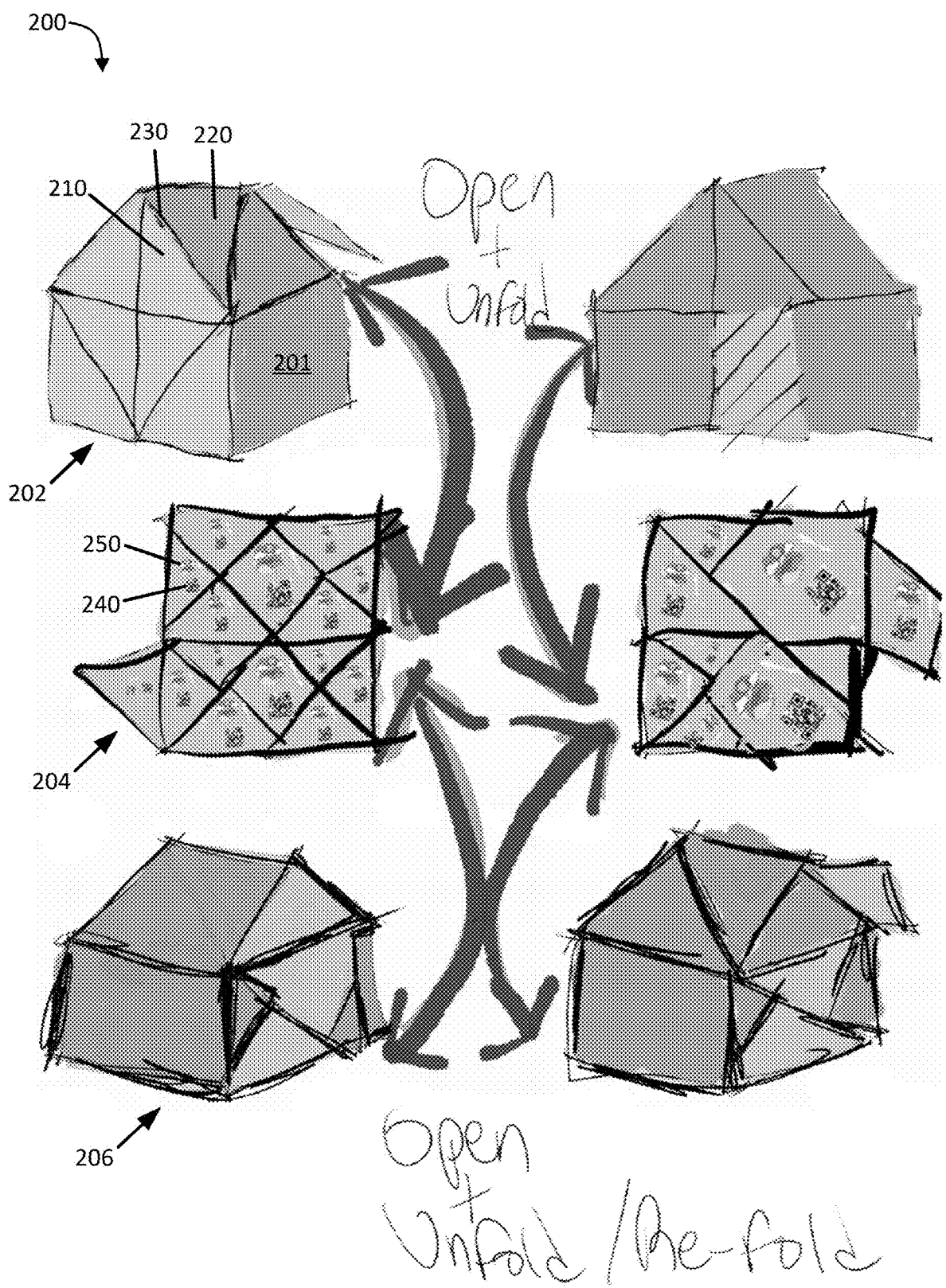
FIG. 2 shows a first example of a plurality of origami configurations that an origami object can assume based on at least one unfolding operation and at least one folding operation, according to an embodiment.

FIG. 2 shows a first example of a plurality of origami configurations 200 that an article 201 can assume based on at least one unfolding operation and/or at least one folding operation, according to an embodiment. The article 201 can be functionally and/or structurally equivalent to, for example, the article 110 of FIG. 1. The article 201 can be an origami object constructed from paper (e.g., origami paper).

The origami configurations 200 that the article 201 can assume can include a first configuration 202 (e.g., a folded configuration), a second configuration 204 (e.g., an unfolded configuration), and a third configuration 206 (e.g., a refolded configuration).

While the article 201 can have a first face 210, a second face 220, a fold 230 (e.g., a crease), a marking 240, and an image 250. While the article 201 is in the first configuration 202, the first face 210 and the second face 220 can be non-planar relative to each other, such that the first face 210 defines a first plane and the second face 220 defines a second plane different from the first plane. The first face 210 and the second face 220 can be bisected by the fold 230. As a result of the first face 210 and the second face 220 being non-planar relative to each other, the first face 210 and the second face 220 can at least partially define a 3D shape and/or an enclosed volume. The article 201 can include a plurality of faces that includes the first face 210 and the second face 220, and while the article 201 is in the first configuration 202, the plurality of faces can define an overall 3D shape (e.g., as shown in FIG. 2, a house). While the article 201 is in the first configuration 202, the marking 240 included on a face from the plurality of faces can be at least partially obfuscated from the perspective of an observer (e.g., a user and/or audience member) of the article 201. To cause the marking 240 to be disposed on the article 201, the marking 240 can be, for example, laminated thereon, directly printed thereon, screen printed, applied as a sticker thereto, etc.

The article 201 can depict instructions (e.g., text, pictures, etc.) for unfolding the article 201. In some implementations, the instructions can be disposed an outwardly extending tab of the article 201 that is visible to the observer while the article 201 is in the first configuration 202. The tab can be a monolithically-formed extension of the paper or an extension coupled (e.g., glued) to the paper (e.g., integrally formed). The instructions can reference a structural feature of the article 201, such as a face(s) to be manipulated to cause the unfolding of the article 201. For example, the instructions can specify that the first face 210 and the second face 220 are each to be pivoted about the fold 230 in opposite directions, such that the first face 210 and the second face 220 are planar or substantially planar relative to each other. Two faces can be substantially planar to each other if, for example, an angle defined between the two faces is greater than 120°. In some instances, a structural feature can include a discernable feature of the 3D shape represented by the article 201. For example, for an article 201 having a 3D shape of a house, a structural feature can include a representation of a window, chimney, etc., and for article 201 having a 3D shape of a house, a structural feature can include a representation of a petal, stem, etc. A user can follow these unfolding instructions to perform an unfolding operation, such that the user can cause the article 201 can assume the second configuration 204.

While the article 201 is in the second configuration 204, the article 201 no longer has the 3D shape as in the first configuration 202. Instead, the article 201 can exhibit a shape of a flattened sheet, such that the first face 210 and the second face 220 can be co-planar or substantially co-planar. While in the second configuration 204, the marking 240 can be visible to the observer (e.g., the user). The marking 240 can include a QR code, as described herein. In some implementations, the article 201 can include a plurality of markings disposed (e.g., printed) on faces of the article 201. As described herein, each marking from the plurality of markings can encode a URL associated with online content. For example, a first marking can encode a first URL associated with a first virtual exhibit of a virtual museum, and a second marking can encode a second URL associated with a second virtual exhibit of the virtual museum.

In some implementations, the plurality of markings can be arranged on the plurality of faces such that a first marking is revealed to a user before a second marking as the user unfolds the article 201. For example, the first marking can be visible to the user, and the second marking can be obfuscated from the user, while the article 201 is in a partially unfolded configuration. The first marking can encode a first URL that links to first online content that the user should view before viewing second online content linked to by a second URL that is encoded by the second marking. For example, the first online content can include an introduction to a topic, and the second online content can include a deeper examination of the topic. Alternatively, the first online content can include a first location in a virtual environment that should be visited prior to a second location included in the second online content. The instructions can specify an unfolding sequence (e.g., a sequence of faces and/or folds to manipulate) that causes the first marking to be made visible to the user prior to the second marking being made visible.

In some implementations, a marking can be disposed across a fold/crease, such that the fold bifurcates the marking. While the article 201 is in the first configuration 202 (or, alternatively, a partially folded configuration), a first portion of the marking can be disposed on a first face, and a second portion of the marking (separated from the first portion by the fold) can be disposed on a second face that is non-planar relative to the first face. While the article is in the second configuration 204, the first portion and the second portion can be substantially planar (described herein), such that the marking can be decoded by a mobile compute device.

In some implementations, the marking 240 can be associated with an image 250. Each marking from the plurality of markings can be associated with an image, and each of these images can be different from the remaining images. The image 250 can be, for example, a photographic image having a depiction associated with the online content linked to by the URL encoded by the marking 240. For example, the photographic image can depict an interviewee that is a subject of the online content.

In some implementations, the article 201 can include refolding instructions that are visible to the user while the article 201 is in the second configuration 204. The refolding instructions can specify a folding operation that the user can perform to cause the article 201 to assume the third configuration 206, where the third configuration 206 can be equivalent or substantially equivalent to the first configuration 202. For example, the overall 3D shape of the article between these two configurations 202 and 206 can be the same or similar (e.g., within 99%, 95%, 90%, 85%, 80%, 75%, and/or any value therebetween). A difference(s) (if any) between the two configurations 202 and 206 can be attributable to, for example, at least one fold (e.g., crease) being disposed in a different location (e.g., the paper is folded differently during the refolding, such that a new fold is defined), a loss of rigidity and/or structural integrity of the paper (e.g., as a result of folding and/or unfolding along a same crease multiple times), paper deformation (e.g., due to the paper being crush while in a folded configuration, the paper becoming torn, the paper becoming wet or damp, etc.) and/or the like. In some instances, the overall 3D shape between these two configurations 202 and 206 can be the same or similar, but one or more faces (e.g., panels) can be in different locations.

In some instances, a paper can be substantially planar if the paper has a measured flatness that is within a tolerance of, for example, 5 mm and/or 1% of the average length of the paper. Flatness can be measured based on, for example, the distance between two planes, the two planes being disposed a minimum distance away from each other while the entirety of the paper is disposed between the two planes. Similar to the discussion above, a paper can be substantially planar (as opposed to planar) due to, for example, folds, creases, crinkles, etc.

Figure 3:
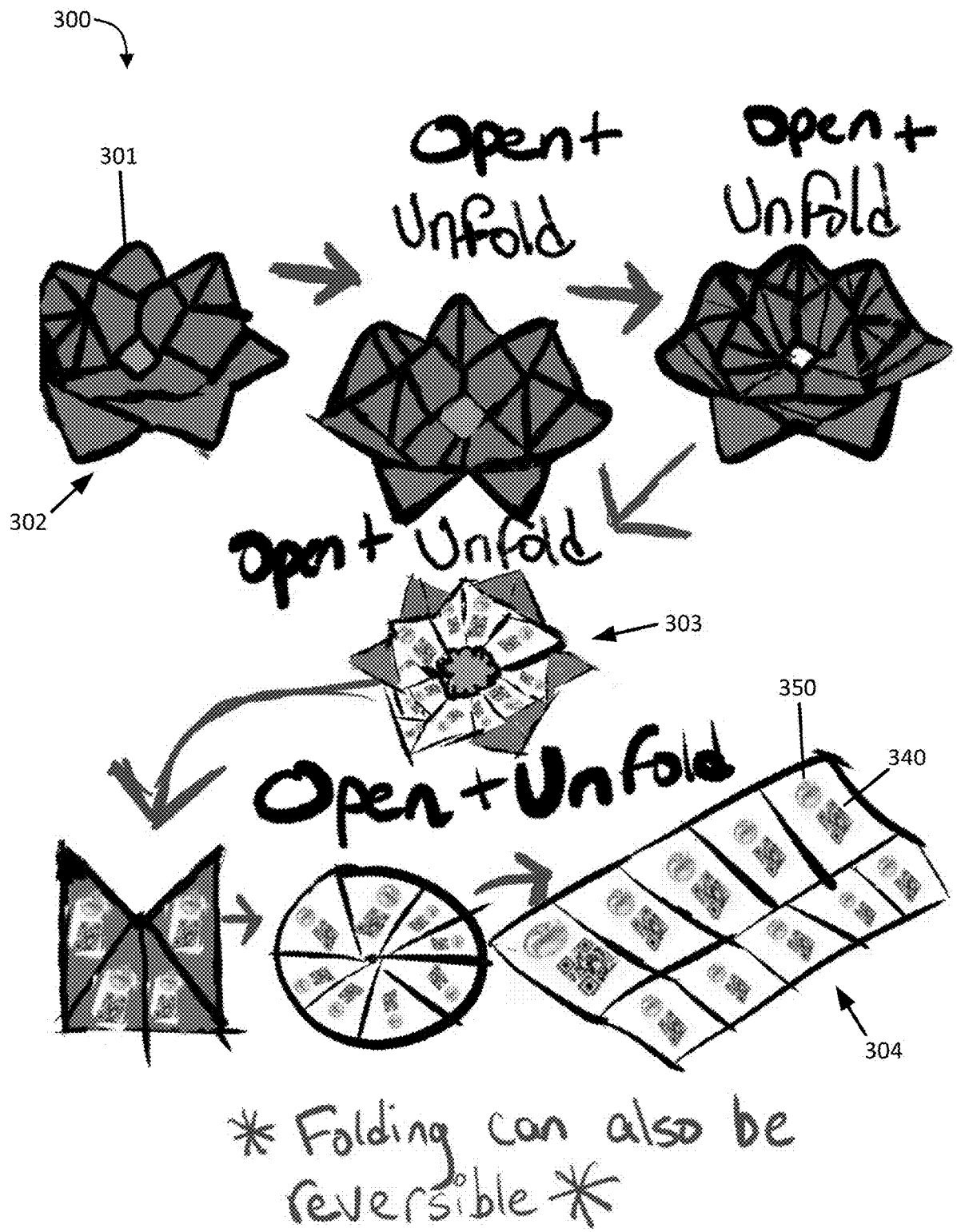
FIG. 3 shows a second example of a plurality of origami configurations that an origami object can assume based on at least one unfolding operation, according to an embodiment.

FIG. 3 shows a second example of a plurality of origami configurations 300 that an article 301 can assume based on at least one unfolding operation, according to an embodiment. The article 301 can have a folded configuration 302, at least one partially unfolded configuration 303, and an unfolded configuration 304. While in the folded configuration 302, the article 301 can have a 3D shape of, for example, a flower, and can obfuscate a plurality of markings (including a marking 340) and/or a plurality of images (including the image 350). While in the partially folded configuration 303, a portion of the plurality of markings (i.e., less than all of the markings from the plurality of markings) can be visible to a user, and a remaining portion of the plurality of markings can be obfuscated from the user. The user can follow instructions disposed on the article 301 to cause the transition from the folded configuration 302 to the partially folded configuration 303, the instructions configured such that the portion of visible markings are reveled to the user before the portion of obfuscated markings. The user can further follow the instructions to perform an additional unfolding operation that causes the article 301 to transition from the partially unfolded configuration 303 to the unfolded configuration 304. In some implementations, the instructions can further specific a folding operation(s) that the user can perform to cause the article 301 to again be in the folded configuration 302.

Figure 4:
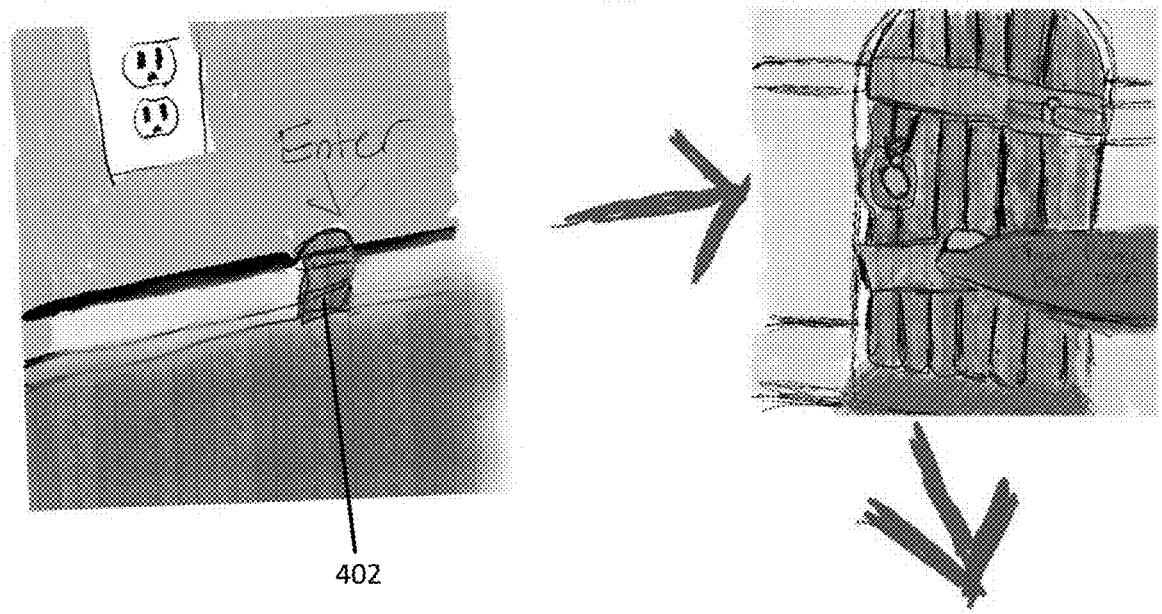
FIG. 4 shows an example operation for manipulating an articulatable door to reveal a marking associated with online content, according to an embodiment.

FIG. 4 shows an example operation 400 for manipulating an articulable door 402 (e.g., a mouse door) to reveal a marking, according to an embodiment. The articulable door 402 can be installed in, for example, a wall, and can include a door covering a recess (e.g., socket) included in the wall. In such an embodiment, a user can push open the articulable door 402 to reveal the recess and/or marking within the recess. In some implementations, the articulable door 402 can be a fairy door installed in, for example, a tree trunk. The recess can include a marking that encodes a URL that links to online content. The recess can further include a depiction disposed on a wall(s) of the recess. The depiction can represent a scene, and the online content can include, for example, an animation that includes a background associated with the scene, such that it appears as though the animation is taking place within the recess. The operation 400 can include a user opening the articulable door to reveal the marking, such that the user can decode the marking using a mobile compute device.

Figure 5:
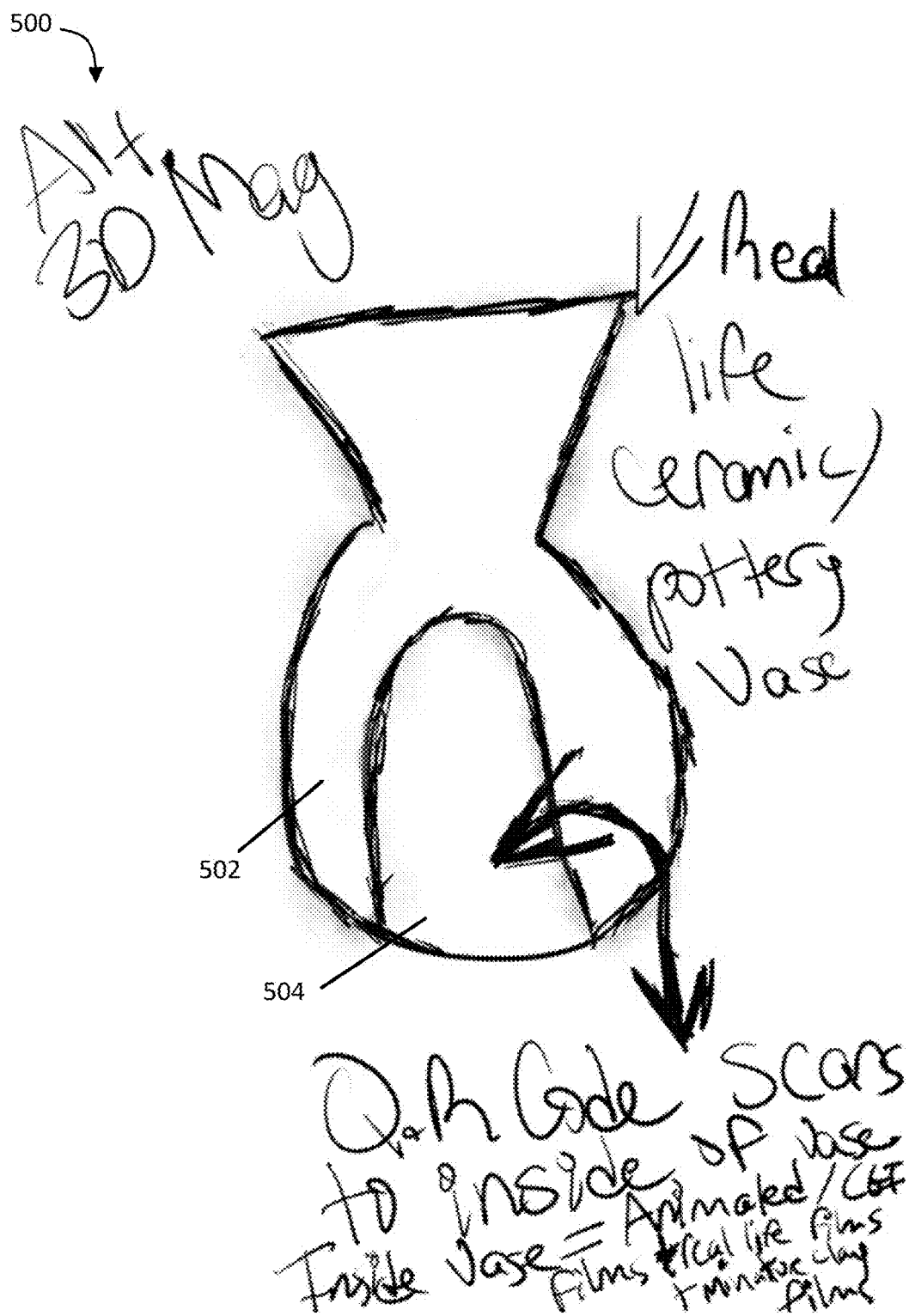
FIG. 5 shows an example of a pottery object that includes a recess and a marking associated with online content, according to an embodiment.

FIG. 5 shows an example of a pottery object 502 that includes a recess 504, according to an embodiment. The recess 504 can include a marking that encodes a URL that links to online content. The recess 504 can further include a depiction disposed on a wall(s) of the recess 504. The depiction can represent a scene, and the online content can include, for example, an animation that includes a background associated with the scene, such that an augmented reality effect is presented to the user (since the animation can appear to the user as taking place within the recess 504). In some implementations, the pottery object 502 can be a ceramic object.

Figure 6:
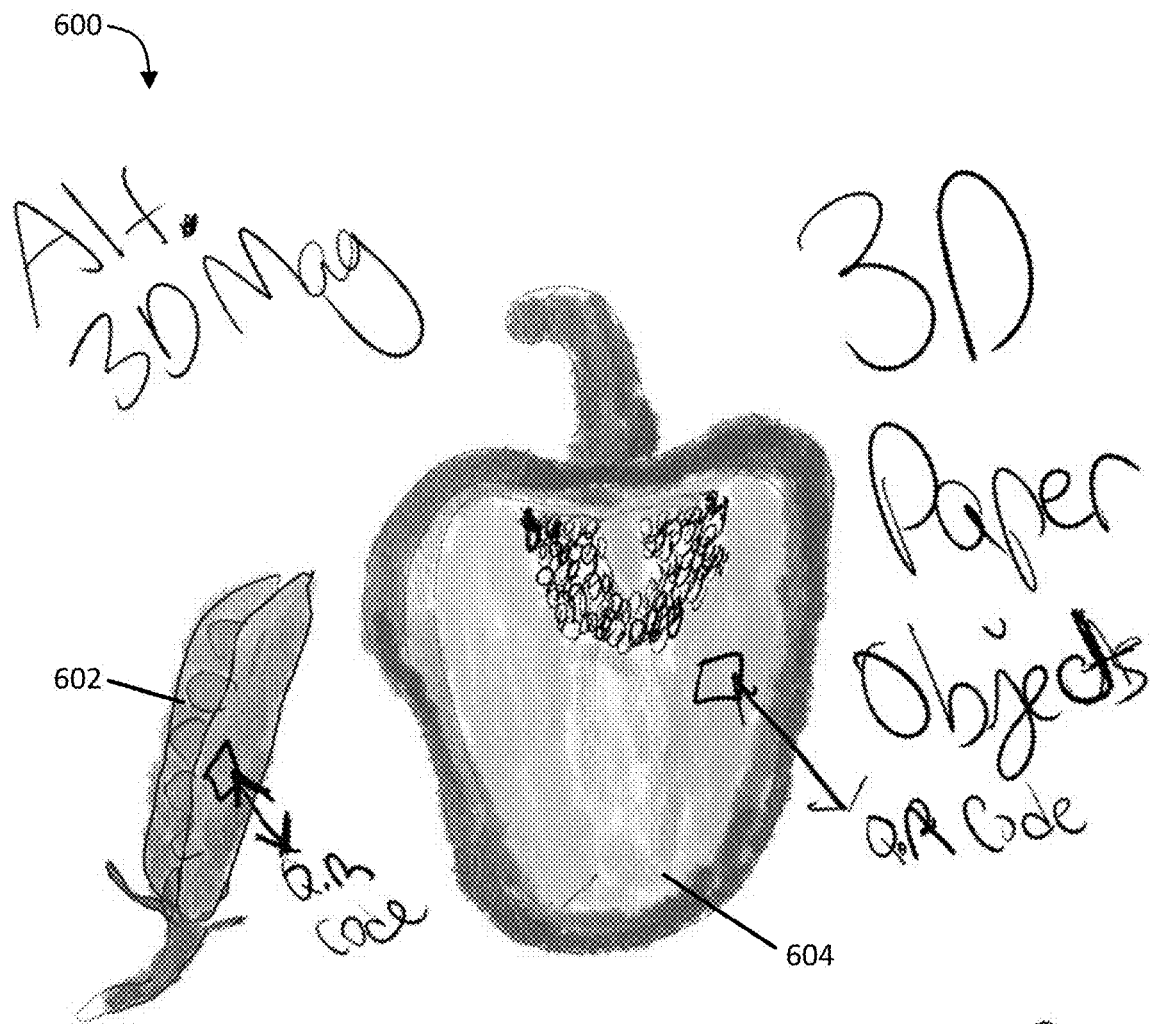
FIG. 6 shows an example of 3D paper objects that can each include markings associated with online content, according to an embodiment.
Figure 7:
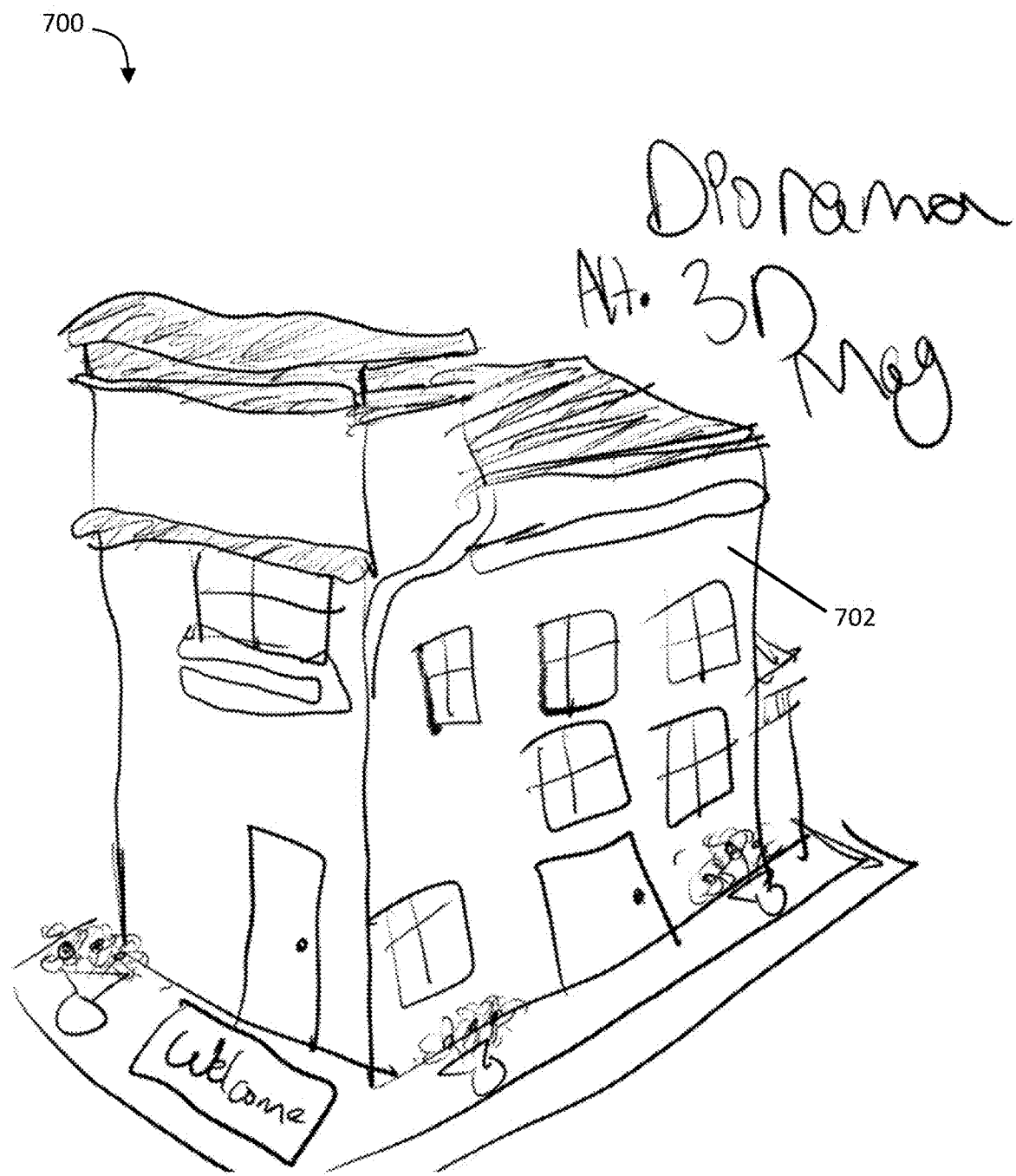
FIG. 7 shows an example of a 3D diorama that can include a marking associated with online content, according to an embodiment.

FIG. 6 shows 3D paper objects 602 and 604 (e.g., papier-mâché objects), according to an embodiment, that can each include a marking (e.g., a QR code) associated with online content. FIG. 7 shows a 3D diorama 702 that can include a marking (not shown in FIG. 7) associated with online content, according to an embodiment.

Figure 8:
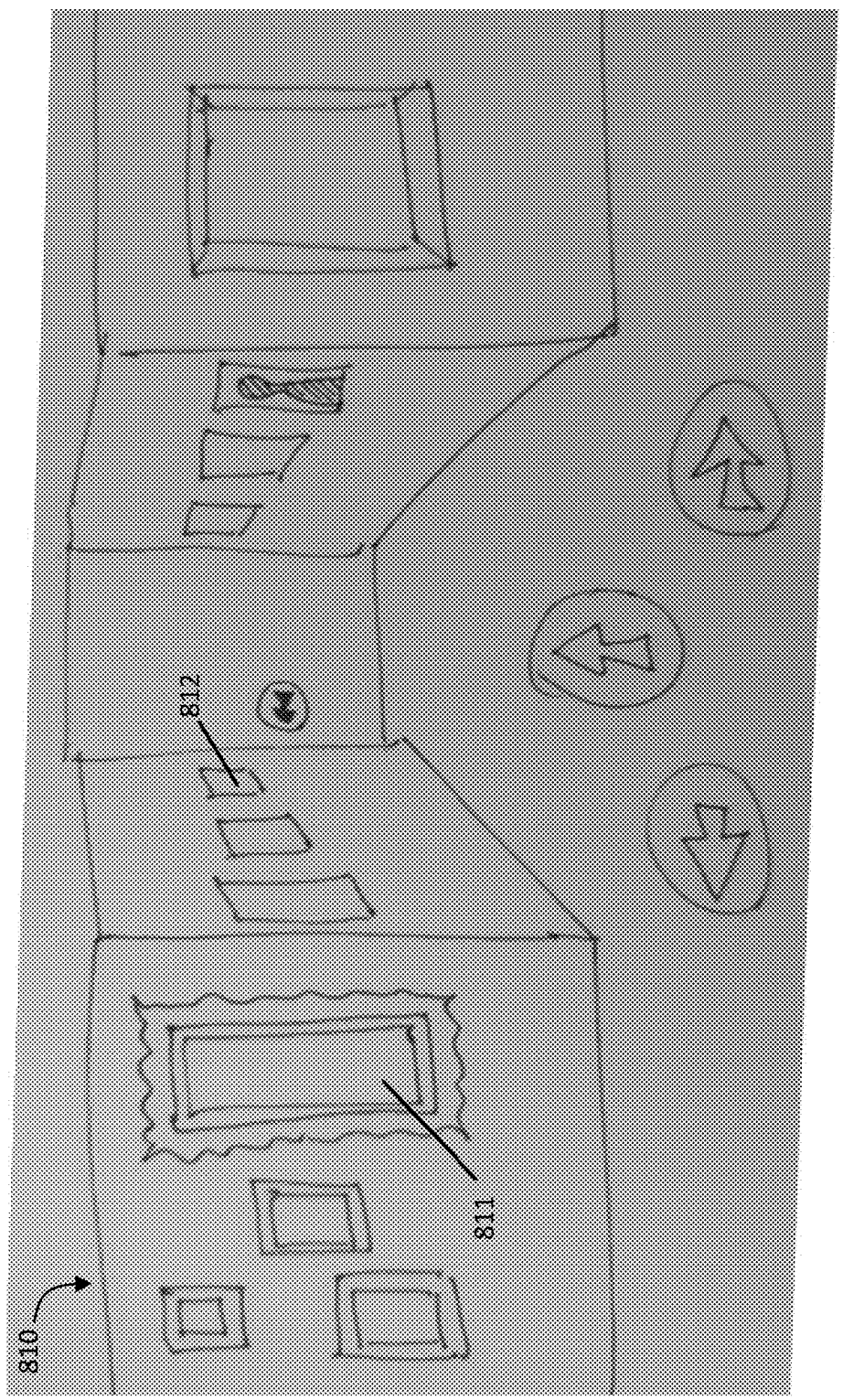
FIG. 8 shows an example of a virtual museum including virtual exhibits, according to an embodiment.

FIG. 8 shows an example of a virtual museum 810, according to an embodiment. The virtual museum 810 can be implemented via software based on, for example, the online content data 136 of FIG. 1. For example, the virtual museum 810 can be an application(s) (e.g., a web application and/or cloud-native application) executed via a processor included in a mobile compute device (e.g., the mobile compute device 120 of FIG. 1). The virtual museum 810 can include a visualization of a virtual environment(s) that can be displayed to a user via the mobile compute device. This virtual environment can include one or more virtual locations (e.g., the virtual museum 810 having multiple virtual exhibits, including a first virtual exhibit 811 and a second virtual exhibit 812 as shown FIG. 8).

The virtual museum 810 can include a GUI (e.g., the navigation arrows depicted in FIG. 8) that a user can interact with to move within the virtual environment (e.g., from the first virtual exhibit 811 to the second virtual exhibit 812, within the virtual museum 810, and/or between multiple virtual museums). In some implementations, the first virtual exhibit 811 of the virtual museum 810 can be associated with a first marking disposed on an article (e.g., any of the articles discussed above such as articles 200, 300, etc.), and the second virtual exhibit 812 can be associated with a second marking disposed on the article. In some implementations, the article can include a third marking that encodes a URL that links to the overall virtual museum (e.g., the virtual museum 810) and not to a particular virtual exhibit (e.g., the first virtual exhibit 811 and/or the second virtual exhibit 812) included in the virtual museum 810. The first virtual exhibit 811 and the second virtual exhibit 812 can each link to additional content (e.g., an article about a first painter and an article about a second painter, respectively) that a user can navigate to via a web browser and/or similar application.

A virtual museum can include a virtual feature, an ambiance, a color scheme, an object, and/or the like, that is associated with the three-dimensional (3D) shape of the article having the quick-response (QR) code that links to virtual museum. For example, the virtual museum can include a virtual body of water and can be associated with an article having a 3D shape of a snorkel. As another example, the virtual museum can include a virtual garden and can be associated with an article having a 3D shape of a flower. In some implementations, a user can select (e.g., via a cursor) the virtual body of water and/or a plant feature within the virtual garden (as applicable), to navigate to additional content (e.g., to an article about swimming and an article about gardening, respectively).

FIG. 9 shows a flowchart illustrating a method 900 of scanning QR codes disposed on an article to navigate to online content, according to an embodiment. At 902, the method 900 includes locating or encountering (e.g., during an unfolding process) a first quick-response (QR) code disposed on a three-dimensional (3D) periodical publication having a 3D shape, the first QR code configured to be located or encountered before a second QR code disposed on the 3D periodical publication is located or encountered. At 904, using a mobile compute device, the first QR code is scanned. At 906, via a browser executed at a processor of the mobile compute device, first online content is navigated to based on a first uniform resource locator (URL) encoded by the first QR code. At 908, the second QR code is located, and at 910, the second QR is scanned. Second online content is navigated to at 912, via the browser executed at the processor of the mobile compute device, and based on a second URL encoded by the second QR code.

According to an embodiment, an article includes a paper having a first configuration and including a plurality of folds and a plurality of faces, the plurality of faces including a first face that defines a first plane and a second face that defines a second plane different from the first plane, the first configuration defining an at least partially enclosed volume. The article also includes a plurality of markings, each marking from the plurality of markings encoding a uniform resource locator (URL) from a plurality of URLs and configured to be decoded using a mobile compute device, the URL being associated with one of a digital magazine or a virtual museum and a first marking from the plurality of markings being disposed on a face that is from the plurality of faces and that is at least partially obfuscated when the paper is in the first configuration. The article also includes at least one instruction for unfolding the paper from the first configuration to a second configuration in which the marking is fully visible.

In some implementations, the plurality of markings can include at least one quick-response (QR) code. In some implementations, the paper, when in the first configuration, can have a three-dimensional shape that can be associated with one of a virtual exhibit of the virtual museum or a topic associated with the digital magazine. In some implementations, the at least one instruction can at least one of: reference a structural feature of the three-dimensional shape, or can be disposed on an outwardly extending tab of the paper. In some implementations, the article can further include an image disposed on the paper and associated with one of a virtual exhibit of the virtual museum or a topic of the digital magazine. In some implementations, a first URL from the plurality of URLs can be associated with a first virtual location of the virtual museum, and a second URL from the plurality of URLs can be associated with a second virtual location of the virtual museum physically distinct within the virtual museum from the first virtual location. In some implementations, the at least one instruction can describe an unfolding sequence related to a sequence of virtual locations that include the first virtual location and the second virtual location.

In some implementations, at least a portion of a fold from the plurality of folds can be disposed between the first face and the second face, and a first portion of the marking can be disposed on the first face and a second portion of the marking can be disposed on the second face. Additionally, a transition from the first configuration to the second configuration can cause the first face to pivot at the fold in a first direction and cause the second face to pivot in a second direction substantially opposite the first direction. Additionally, the first face and the second face can be substantially planar when the paper is in the second configuration. In some implementations, the URL encoded by the marking can be further associated with instructions for transforming the paper from the second configuration to the first configuration. In some implementations, the paper can be associated with a periodical.

According to an embodiment, an article includes a three-dimensional periodical publication including a paper having a plurality of folds defined therein and configured such that the paper, when folded along the plurality of folds, has a three-dimensional shape. The article also includes a quick-response (QR) code disposed on a portion of the paper that is not outwardly visible by an observer a non-zero distance from the paper when the paper has the three-dimensional shape, the QR code configured to cause a compute device to access online content associated with the three-dimensional periodical publication.

In some implementations, the paper can include a protrusion that includes an indication of an unfolding sequence that causes the QR code to be fully visible by the observer, the indication referencing a structural feature of the three-dimensional shape. In some implementations, the protrusion can be a first protrusion and the article can further include a second protrusion disposed on the paper and that includes an indication of a folding sequence that causes the QR code to be at least partially hidden. In some implementations, the QR code can be a first QR code, the portion of the paper can be a first portion of the paper, the online content can be first online content, and the article can further include a second QR code disposed on a second portion of the paper that is at least partially hidden when the paper has the three-dimensional shape, the second QR code configured to cause the compute device to access second online content associated with the three-dimensional periodical publication.

In some implementations, the first online content can include a first view of a spatial representation, the second online content can include a second view of the spatial representation, and the unfolding sequence can be associated with a sequence that includes the first view and the second view. In some implementations, a user can navigate, within a virtual environment, at least one of: from the first online content to the second online content, or from the second online content to the first online content. In some implementations, the online content can include an image associated with the three-dimensional shape. In some implementations, the article can further include a photographic image disposed thereon, the photographic image associated with the online content. In some implementations, the three-dimensional periodical publication can have an overall shape that is related to a topic of the online content.

According to an embodiment, a method includes scanning, using a mobile compute device, a quick-response (QR) code disposed on a three-dimensional (3D) periodical publication having a 3D shape. The method also includes navigating, via a browser executed at a processor of the mobile compute device, to the online content based on a uniform resource locator (URL) encoded by the QR code, the online content having a topic indicated by the 3D shape.

In some implementations, the 3D periodical publication can include at least one of a 3D papercraft object, a 3D articulable door, a 3D pottery object, a 3D ceramics object, or a 3D diorama object. In some implementations, the QR code can be a first QR code, the online content can be first online content, and the URL can be a first URL. Additionally, the method can further include scanning, using the mobile device, a second QR code disposed on the 3D periodical publication, and navigating, via the browser executed at the processor of the mobile compute device, to second online content based on a second URL encoded by the second URL. The method can also include navigating, via the browser executed at the processor of the mobile compute device, to the first online content from the second online content without scanning the first URL code.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An article, comprising:
   a paper having a first configuration and including a plurality of folds and a plurality of faces, the plurality of faces including a first face that defines a first plane and a second face that defines a second plane different from the first plane, the first configuration defining an at least partially enclosed volume;
   a plurality of markings, each marking from the plurality of markings encoding a uniform resource locator (URL) from a plurality of URLs and configured to be decoded using a mobile compute device, the URL being associated with one of a digital magazine or a virtual museum, the plurality of markings including:
      a first marking encoding a first URL and being disposed on a first face that is from the plurality of faces and that is at least partially obfuscated when the paper is in the first configuration, and
      a second marking (1) encoding a second URL to be visited after the first URL and (2) being disposed on a second face that is from the plurality of faces and that is at least partially obfuscated when the paper is in the first configuration;
   at least one instruction for unfolding the paper from the first configuration to a second configuration in which the first marking is fully visible and the second marking is at least partially obfuscated; and
   at least one instruction for unfolding the paper from the second configuration to a third configuration in which the second marking is fully visible,
   the paper, when in the first configuration, having a three-dimensional shape that indicates a topic of at least one of (1) a virtual exhibit of the virtual museum or (2) a portion of the digital magazine, associated with at least one of the first URL or the second URL.

2. The article of claim 1, wherein the plurality of markings includes at least one quick-response (QR) code.

3. The article of claim 1, wherein the at least one instruction at least one of:
   references a structural feature of the three-dimensional shape; or
   is disposed on an outwardly extending tab of the paper.

4. The article of claim 1, further comprising an image disposed on the paper and associated with one of the virtual exhibit of the virtual museum or the topic.

5. The article of claim 1, wherein:
   the first URL is associated with a first virtual location of the virtual museum; and
   the second URL is associated with a second virtual location of the virtual museum physically distinct within the virtual museum from the first virtual location.

6. The article of claim 5, wherein the at least one instruction describes an unfolding sequence related to a sequence of virtual locations that include the first virtual location and the second virtual location.

7. The article of claim 1, wherein:
at least a portion of a fold from the plurality of folds is disposed between the first face and the second face;
a first portion of the marking is disposed on the first face and a second portion of the marking is disposed on the second face;
a transition from the first configuration to the second configuration causes the first face to pivot at the fold in a first direction and causes the second face to pivot in a second direction substantially opposite the first direction; and
the first face and the second face are substantially planar when the paper is in the second configuration.

8. The article of claim 1, wherein the URL encoded by the second marking is further associated with instructions for transforming the paper from the third configuration to the first configuration.

9. The article of claim 1, wherein the paper is associated with a periodical.

10. An article, comprising:
a three-dimensional (3D) periodical publication including a paper having a plurality of folds defined therein and configured such that the paper, when folded along the plurality of folds, has a 3D shape;
a first quick-response (QR) code disposed on a first portion of the paper that is not outwardly visible by an observer a non-zero distance from the paper when the paper has the 3D shape, the first QR code configured to cause a compute device to access first online content; and
a second QR code disposed on a second portion of the paper that is not outwardly visible by the observer when the paper has the 3D shape, the second QR code configured to cause the compute device to access second online content to be viewed after the first online content, the 3D periodical publication configured such that the first portion of the paper is revealed to the observer before the second portion of the paper while the 3D periodical publication is being unfolded.

11. The article of claim 10, wherein the paper includes a protrusion that includes an indication of an unfolding sequence that causes the first QR code to be fully visible by the observer before the second QR code, the indication referencing a structural feature of the 3D shape.

12. The article of claim 11, wherein the protrusion is a first protrusion and the article further comprises a second protrusion disposed on the paper and that includes an indication of a folding sequence that causes the first QR code to be at least partially hidden.

13. The article of claim 11, wherein:
the first online content includes a first view of a virtual environment;
the second online content includes a second view of the virtual environment; and
the unfolding sequence is associated with a sequence that includes the first view and the second view.

14. The article of claim 13, wherein the virtual environment that is navigable from at least one of: the first online content to the second online content, or the second online content to the first online content.

15. The article of claim 10, wherein:
the first QR code encodes an address of the first online content; and
the first online content includes at least one of an image or a discussion, associated with a topic connected to the 3D shape.

16. The article of claim 10, further comprising a first photographic image and a second photographic image disposed thereon, the first photographic image associated with the first online content and the second photographic image associated with the second online content.

17. A method, comprising:
locating a first quick-response (QR) code disposed on a three-dimensional (3D) periodical publication having a 3D shape, the first QR code configured to be located before a second QR code disposed on the 3D periodical publication;
scanning, using a mobile compute device, the first QR code;
navigating, via a browser executed at a processor of the mobile compute device, to first online content based on a first uniform resource locator (URL) encoded by the first QR code;
locating the second QR code;
scanning, using the mobile compute device, the second QR code; and
navigating, via the browser executed at the processor of the mobile compute device, to second online content based on a second URL encoded by the second QR code.

18. The method of claim 17, wherein the 3D periodical publication includes at least one of a 3D papercraft object, a 3D articulable door, a 3D pottery object, a 3D ceramics object, or a 3D diorama object.

19. The method of claim 17, further comprising:
unfolding, before the scanning the first QR code, a first portion of the 3D periodical publication to reveal the first QR code; and
unfolding, after the scanning the first QR code and before the scanning the second QR code, a second portion of the 3D periodical publication to reveal the second QR code.

20. An article, comprising:
a paper having a first configuration and including a plurality of folds and a plurality of faces, the plurality of faces including a first face that defines a first plane and a second face that defines a second plane different from the first plane, the first configuration defining an at least partially enclosed volume;
a plurality of markings, each marking from the plurality of markings encoding a uniform resource locator (URL) from a plurality of URLs and configured to be decoded using a mobile compute device, the URL being associated with one of a digital magazine or a virtual museum, the plurality of markings including:
a first marking encoding a first URL and being disposed on a first face that is from the plurality of faces and that is at least partially obfuscated when the paper is in the first configuration, and
a second marking (1) encoding a second URL to be visited after the first URL and (2) being disposed on a second face that is from the plurality of faces and that is at least partially obfuscated when the paper is in the first configuration;
at least one instruction for unfolding the paper from the first configuration to a second configuration in which the first marking is fully visible and the second marking is at least partially obfuscated;
at least one instruction for unfolding the paper from the second configuration to a third configuration in which the second marking is fully visible; and an image disposed on the paper and associated with one of a virtual exhibit of the virtual museum or a topic of the digital magazine.

21. An article, comprising:
a paper having a first configuration and including a plurality of folds and a plurality of faces, the plurality of faces including a first face that defines a first plane and a second face that defines a second plane different from the first plane, the first configuration defining an at least partially enclosed volume;
a plurality of markings, each marking from the plurality of markings encoding a uniform resource locator (URL) from a plurality of URLs and configured to be decoded using a mobile compute device, the URL being associated with one of a digital magazine or a virtual museum, the plurality of markings including:
   a first marking encoding a first URL and being disposed on a first face that is from the plurality of faces and that is at least partially obfuscated when the paper is in the first configuration, the first URL associated with a first virtual location of the virtual museum, and
   a second marking (1) encoding a second URL to be visited after the first URL and (2) being disposed on a second face that is from the plurality of faces and that is at least partially obfuscated when the paper is in the first configuration, the second URL associated with a second virtual location of the virtual museum physically distinct within the virtual museum from the first virtual location;
at least one instruction for unfolding the paper from the first configuration to a second configuration in which the first marking is fully visible and the second marking is at least partially obfuscated; and
at least one instruction for unfolding the paper from the second configuration to a third configuration in which the second marking is fully visible.

22. An article, comprising:
a paper having a first configuration and including a plurality of folds and a plurality of faces, the plurality of faces including a first face that defines a first plane and a second face that defines a second plane different from the first plane, the first configuration defining an at least partially enclosed volume;
a plurality of markings, each marking from the plurality of markings encoding a uniform resource locator (URL) from a plurality of URLs and configured to be decoded using a mobile compute device, the URL being associated with one of a digital magazine or a virtual museum, the plurality of markings including:
   a first marking encoding a first URL and being disposed on a first face that is from the plurality of faces and that is at least partially obfuscated when the paper is in the first configuration, and
   a second marking (1) encoding a second URL to be visited after the first URL and (2) being disposed on a second face that is from the plurality of faces and that is at least partially obfuscated when the paper is in the first configuration;
at least one instruction for unfolding the paper from the first configuration to a second configuration in which the first marking is fully visible and the second marking is at least partially obfuscated; and
at least one instruction for unfolding the paper from the second configuration to a third configuration in which the second marking is fully visible,
at least a portion of a fold from the plurality of folds being disposed between the first face and the second face;
a first portion of the first marking being disposed on the first face and a second portion of the first marking is disposed on the second face;
a transition from the first configuration to the second configuration configured to cause the first face to pivot at the fold in a first direction and to cause the second face to pivot in a second direction substantially opposite the first direction; and
the first face and the second face being substantially planar when the paper is in the second configuration.

23. An article, comprising:
a paper having a first configuration and including a plurality of folds and a plurality of faces, the plurality of faces including a first face that defines a first plane and a second face that defines a second plane different from the first plane, the first configuration defining an at least partially enclosed volume;
a plurality of markings, each marking from the plurality of markings encoding a uniform resource locator (URL) from a plurality of URLs and configured to be decoded using a mobile compute device, the URL being associated with one of a digital magazine or a virtual museum, the plurality of markings including:
   a first marking encoding a first URL and being disposed on a first face that is from the plurality of faces and that is at least partially obfuscated when the paper is in the first configuration, and
   a second marking (1) encoding a second URL to be visited after the first URL and (2) being disposed on a second face that is from the plurality of faces and that is at least partially obfuscated when the paper is in the first configuration;
at least one instruction for unfolding the paper from the first configuration to a second configuration in which the first marking is fully visible and the second marking is at least partially obfuscated; and
at least one instruction for unfolding the paper from the second configuration to a third configuration in which the second marking is fully visible,
the second URL being associated with instructions for transforming the paper from the third configuration to the first configuration.

24. An article, comprising:
a paper having a first configuration and including a plurality of folds and a plurality of faces, the plurality of faces including a first face that defines a first plane and a second face that defines a second plane different from the first plane, the first configuration defining an at least partially enclosed volume, the paper being associated with a periodical;
a plurality of markings, each marking from the plurality of markings encoding a uniform resource locator (URL) from a plurality of URLs and configured to be decoded using a mobile compute device, the URL being associated with one of a digital magazine or a virtual museum, the plurality of markings including:
   a first marking encoding a first URL and being disposed on a first face that is from the plurality of faces and that is at least partially obfuscated when the paper is in the first configuration, and
   a second marking (1) encoding a second URL to be visited after the first URL and (2) being disposed on a second face that is from the plurality of faces and that is at least partially obfuscated when the paper is in the first configuration;

at least one instruction for unfolding the paper from the first configuration to a second configuration in which the first marking is fully visible and the second marking is at least partially obfuscated; and at least one instruction for unfolding the paper from the second configuration to a third configuration in which the second marking is fully visible.

\* \* \* \* \*